US011810396B2

(12) United States Patent
Shreve et al.

(10) Patent No.: US 11,810,396 B2
(45) Date of Patent: Nov. 7, 2023

(54) IMAGE ANNOTATION USING PRIOR MODEL SOURCING

(71) Applicant: PALO ALTO RESEARCH CENTER INCORPORATED, Palo Alto, CA (US)

(72) Inventors: Matthew Shreve, Campbell, CA (US); Raja Bala, Pittsford, NY (US); Jeyasri Subramanian, Sunnyvale, CA (US)

(73) Assignee: Xerox Corporation, Norwalk, CT (US)

( * ) Notice: Subject to any disclaimer, the term of this patent is extended or adjusted under 35 U.S.C. 154(b) by 286 days.

(21) Appl. No.: 17/233,365

(22) Filed: Apr. 16, 2021

(65) Prior Publication Data

US 2022/0335239 A1 Oct. 20, 2022

(51) Int. Cl.
| | | |
|---|---|---|
| G06F 16/535 | (2019.01) | |
| G06V 40/16 | (2022.01) | |
| G06F 16/58 | (2019.01) | |
| G06F 16/55 | (2019.01) | |
| G06F 16/538 | (2019.01) | |
| G06F 18/214 | (2023.01) | |
| G06V 10/774 | (2022.01) | |

(52) U.S. Cl.
CPC .......... *G06V 40/169* (2022.01); *G06F 16/535* (2019.01); *G06F 16/538* (2019.01); *G06F 16/55* (2019.01); *G06F 16/5866* (2019.01); *G06F 18/214* (2023.01); *G06V 10/774* (2022.01); *G06V 40/164* (2022.01)

(58) Field of Classification Search
None
See application file for complete search history.

(56) References Cited

U.S. PATENT DOCUMENTS

| | | | | |
|---|---|---|---|---|
| 10,222,942 | B1 * | 3/2019 | Zeiler | ................... G06N 5/022 |
| 10,339,216 | B2 * | 7/2019 | Marcus | ................ G06F 40/211 |
| 10,719,301 | B1 * | 7/2020 | Dasgupta | ............ G06V 10/774 |
| 11,556,746 | B1 * | 1/2023 | Dasgupta | ............... G06F 18/24 |
| 2021/0176342 | A1 * | 6/2021 | Pang | .................... H04L 63/168 |

FOREIGN PATENT DOCUMENTS

WO WO-2022038440 A1 * 2/2022

OTHER PUBLICATIONS

Yap, M.H.—"Automated Facial Wrinkles Annotator"—ECCV 2018, pp. 1-5 (Year: 2018).*

* cited by examiner

*Primary Examiner* — Bernard Krasnic
(74) *Attorney, Agent, or Firm* — Womble Bond Dickinson (US) LLP (57) ABSTRACT

A method of image annotation includes selecting a plurality of annotation models related to an annotation task for an image, obtaining a candidate annotation map for the image from each of the plurality of annotation models, and selecting at least one of the candidate annotation maps to be displayed via a user interface, the candidate annotation maps comprising suggested annotations for the image. The method further includes receiving user selections or modifications of at least one of the suggested annotations from the candidate annotation map and generating a final annotation map based on the user selections or modifications.

17 Claims, 5 Drawing Sheets

IMAGE ANNOTATION USING PRIOR MODEL SOURCING

TECHNICAL FIELD

Implementations of the present disclosure relate to machine learning, and more particularly to image annotation using prior model sourcing.

BACKGROUND

Machine learning is an application of artificial intelligence (AI) that provides systems the ability to automatically learn and improve from experience without being explicitly programmed. Machine learning focuses on the development of computer programs that can access data and use it learn for themselves. The process of learning begins with observations or data, such as examples, direct experience, or instruction, in order to look for patterns in data and make better decisions in the future based on provided examples. The primary aim is to allow the computers to learn automatically without human intervention or assistance and adjust actions accordingly.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Machine learning models may utilize large datasets to sufficiently train the model to perform a desired task. For example, for a machine learning model to accurately provide wrinkle detection for a picture of a user's face, the model may need to be trained with a large number of annotated images (e.g., thousands or hundreds of thousands of images). However, manual collection and annotation of large image datasets can be a costly and time consuming process, particularly in images where annotations are at the pixel scale (e.g., tracing wrinkles in a high-resolution face image with a mouse or touchscreen). In some instances, an expert (e.g., a clinician for annotating wrinkles in skin or blood vessels in the retina) may be required to annotate the images which may result in substantial cost due to the significant time required to perform the image annotations.

Conventional systems may be used to manually label images at the pixel level. Typically, these tools allow a user to pick a color and associate it with a class. A user then draws on the image after picking a color, such as with a mouse or touch-screen device. The output of these systems may be an annotation map that indicates which color (or no color at all) was chosen for each pixel. However, the annotation map is initially blank with none of the pixels being annotated at the start of the annotation process, thereby requiring the annotator to start the process from scratch with every image.

Embodiments of the present disclosure address the above deficiencies by using prior annotation models to initially populate a candidate annotation map that can be used as a starting point for further manual annotation. The prior annotation models may be trained on tasks related to the desired annotation, such as using a retinal segmentation model for wrinkle detection. The prior models may also be based on simple computer vision operators (e.g., Gabor filters, edge detection operators and the like). Accordingly, the present system provides a user with multiple possible annotation maps (referred to herein as "candidate maps") that can be sourced from so that the user does not need to manually and tediously draw each image annotation by hand.

In one example, the annotations for the output annotation map may be sourced by dragging a cursor (e.g., a mouse cursor) across regions of the candidate map. In another example, the output annotation map may be sourced by selecting portions of the candidate map in any other way (e.g., left click, drag and drop, etc.). The user may select and switch between candidate maps (i.e., different candidate maps generated by different prior models) and source from multiple candidate maps during annotation to create the output annotation map. The user may also manually add annotations to the image through conventional methods, or delete all or a portion of an annotation in the candidate maps.

In one example, after an output annotation map is completed by the user, the output annotation map may be provided back to one or more of the prior models to update and/or retrain the models. For example, after a defined number of final output annotation maps are completed by the user, those output annotation maps may be provided to the prior models for update and/or retraining. In this way, the models may become more accurate over time, resulting in less manual effort and time by the user to modify and generate the output annotation map.

Figure 1:
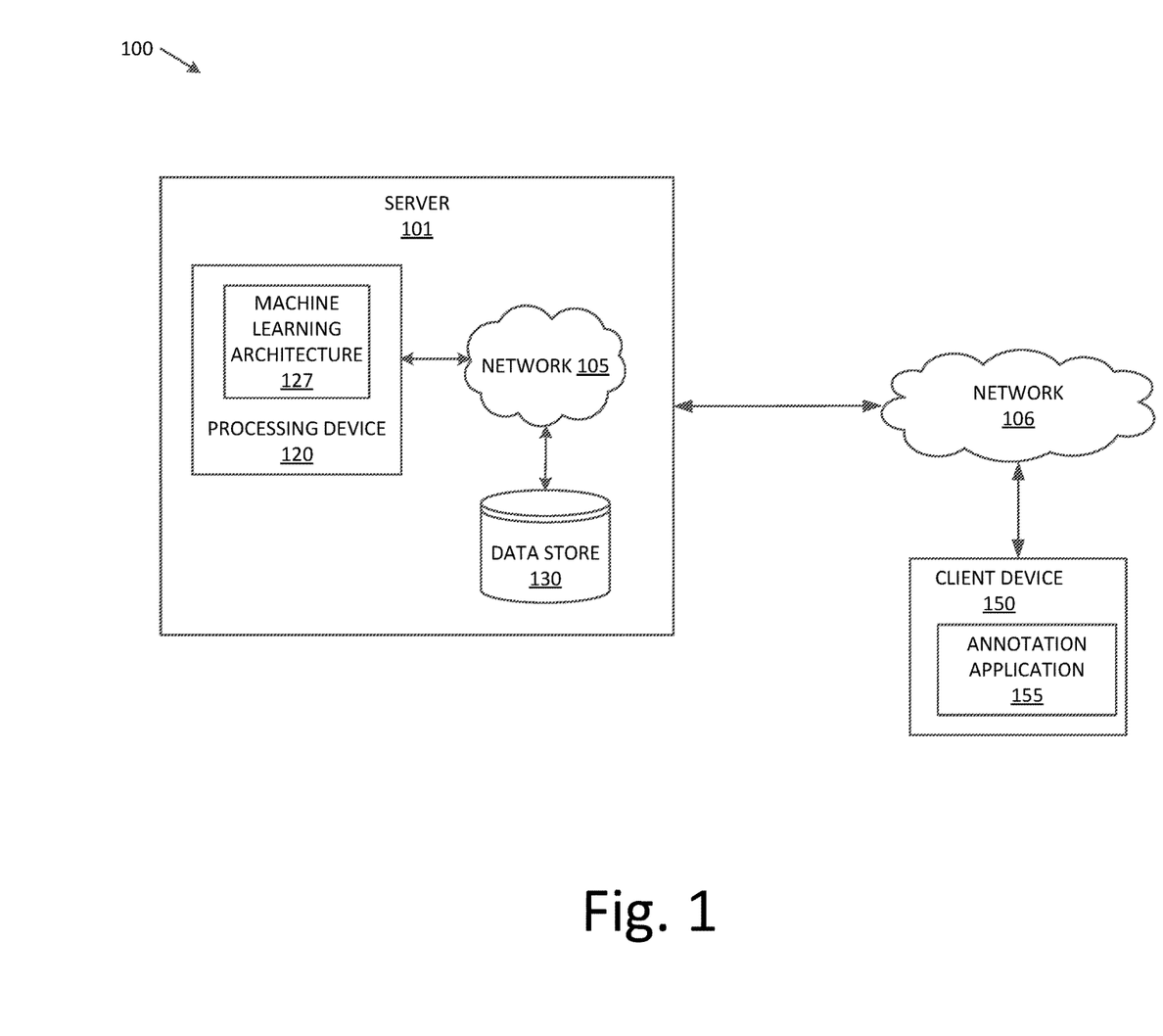
FIG. 1 is a diagram showing a machine learning system for use with implementations of the present disclosure.

FIG. 1 is a diagram showing a machine learning system 100 for use with implementations of the present disclosure. Although specific components are disclosed in machine learning system 100, it should be appreciated that such components are examples. That is, embodiments of the present invention are well suited to having various other components or variations of the components recited in machine learning system 100. It is appreciated that the components in machine learning system 100 may operate with other components than those presented, and that not all of the components of machine learning system 100 may be required to achieve the goals of machine learning system 100.

In one embodiment, system 100 includes server 101, network 106, and client device 150. Server 100 may include various components, which may allow for annotation of images using prior model sourcing. Each component may perform different functions, operations, actions, processes, methods, etc., for a web application and/or may provide different services, functionalities, and/or resources for the web application. Server 100 may include machine learning architecture 127 of processing device 120 to perform operations related to image annotation using prior model sourcing. In one embodiment, processing device 120 one or more graphics processing units of one or more servers (e.g., including server 101). Additional details of machine learning architecture 127 are provided with respect to FIGS. 2-5. Server 101 may further include network 105 and data store 130.

The processing device 120 and the data store 130 are operatively coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc. The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The server 100 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

As discussed herein, the server 101 may provide machine learning functionality to a client device (e.g., client device 150). In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 100.

In one example, client device 150 includes an application 155 for performing operations related to annotation of images using prior model sourcing. In one embodiment, annotation application 155 performs the operations discussed Further implementation details of the operations performed by system 101 are described with respect to FIGS. 2-5.

Figure 2:
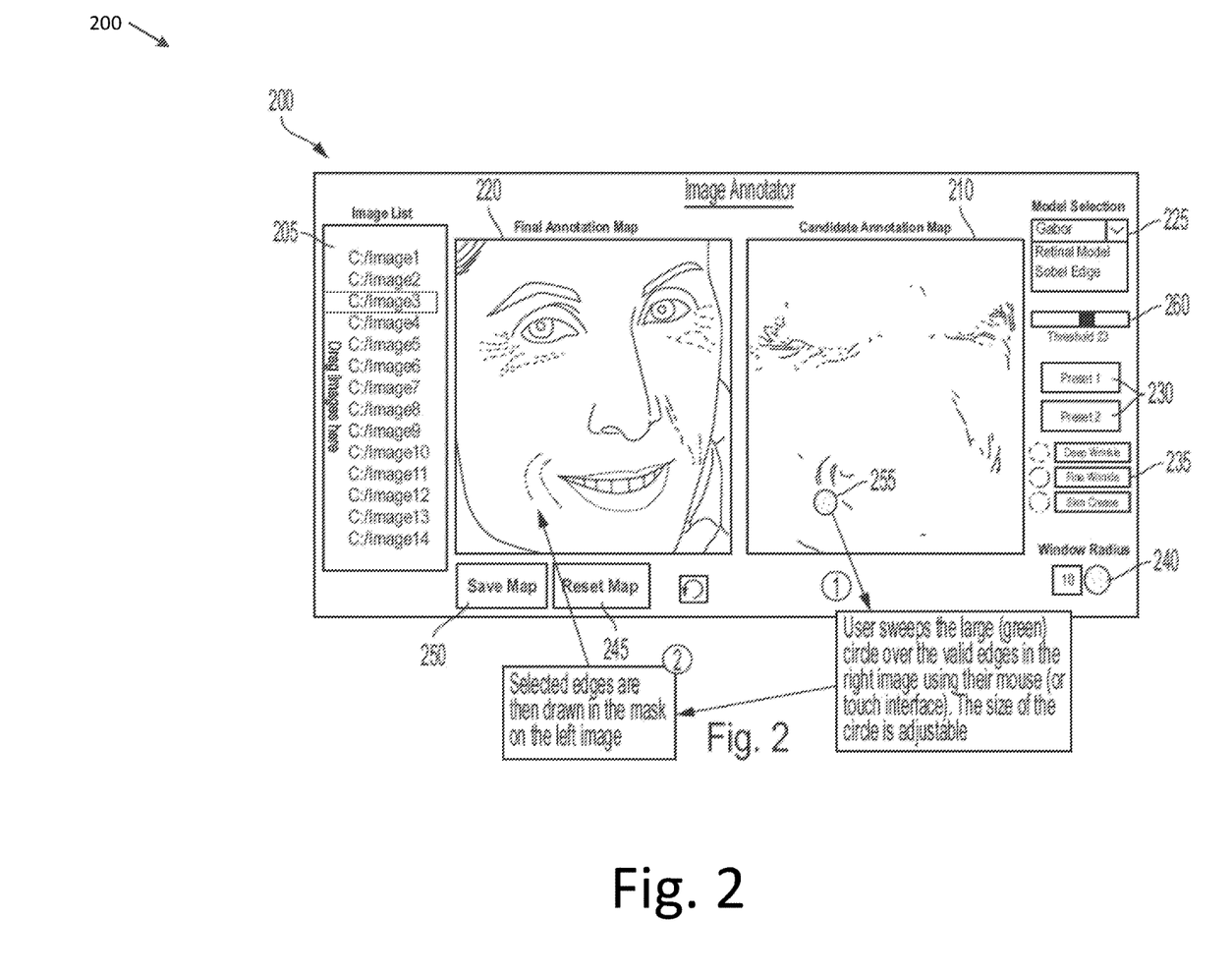
FIG. 2 is a graphical diagram showing an example user interface for image annotation using prior model sourcing, in accordance with some embodiments.

FIG. 2 is a graphical diagram illustrating an example user interface 200 for image annotation using prior model sourcing. The user interface 200 may include an image list 205, a candidate annotation map 210, a final annotation map 220 and a model selector 225. A user may select one of the images from the image list 205 to be annotated. The image list 205 may include a list of images that the user would like to annotate. The user may drag images into the image list 205 or select them to be added to the image list 205 using any other file selection tool. The user may further select a model using the model selection 225 that will generate and display the candidate annotation map 210 based on the image selected from the image list 205. The model selection 225 may provide an option to the user to select one or more models to generate a candidate annotation map. The user can then use the cursor window 255 to select portions of the candidate annotation map 210 to be included or removed from the final annotation map 220. It should be noted that any other method may be used to select the portions of the candidate annotation map 210 to be included in the final annotation map 220.

In one embodiment, the user interface 200 further includes a defined set of parameters 260 for each of the models. The parameters 260 may be used to define thresholds for parameters of the selected model. For example, the parameters 260 may include a contrast based threshold, a gradient based threshold, fineness threshold, coarseness threshold and so forth. The user may adjust the parameter thresholds to include more or fewer suggested annotations in the candidate annotation map 210.

In one embodiment, the user interface 200 may include one or more presets 230. The user may save a particular combination or configuration of model, parameter thresholds, window radius, and so forth. For example, a particular configuration may work particularly well for certain annotation tasks of the user so the user may save the configuration as one of the presets 230 that can quickly be selected by the user to generate candidate annotation maps for future images. Additionally, the user interface 200 may include a class selection option 235. The user may use the class selection option 235 to assign a label to each available color used to annotate an image. For example, as depicted in FIG. 2, three different colors are available and assigned a label for different wrinkle types (i.e., deep wrinkle, fine wrinkle, and skin crease). However, any number of colors and classes may be used. In one embodiment, the associations between colors and classes may be specified outside of the user interface 200 in parameters provided to the user interface 200 rather than displayed in the user interface 200.

In one embodiment, the user interface 200 includes a window radius selector 240. The window radius selector 240 may be used to select a radius for the window cursor 255. Additionally, the window radius selector 240 may include an option for the user to select a shape of the window cursor (e.g., rectangle, ellipse, etc.). In one embodiment, the user interface 200 also includes a reset map option 245 for completely removing all annotations from the final annotation map 220. Similarly, the user interface may include an undo button 260 to remove annotations from the final annotation map 220 added by the last sweep/selection. In one embodiment, the user interface 200 includes a save map option 250 to store the final annotation map 220 to a file in computer storage.

Figure 3:
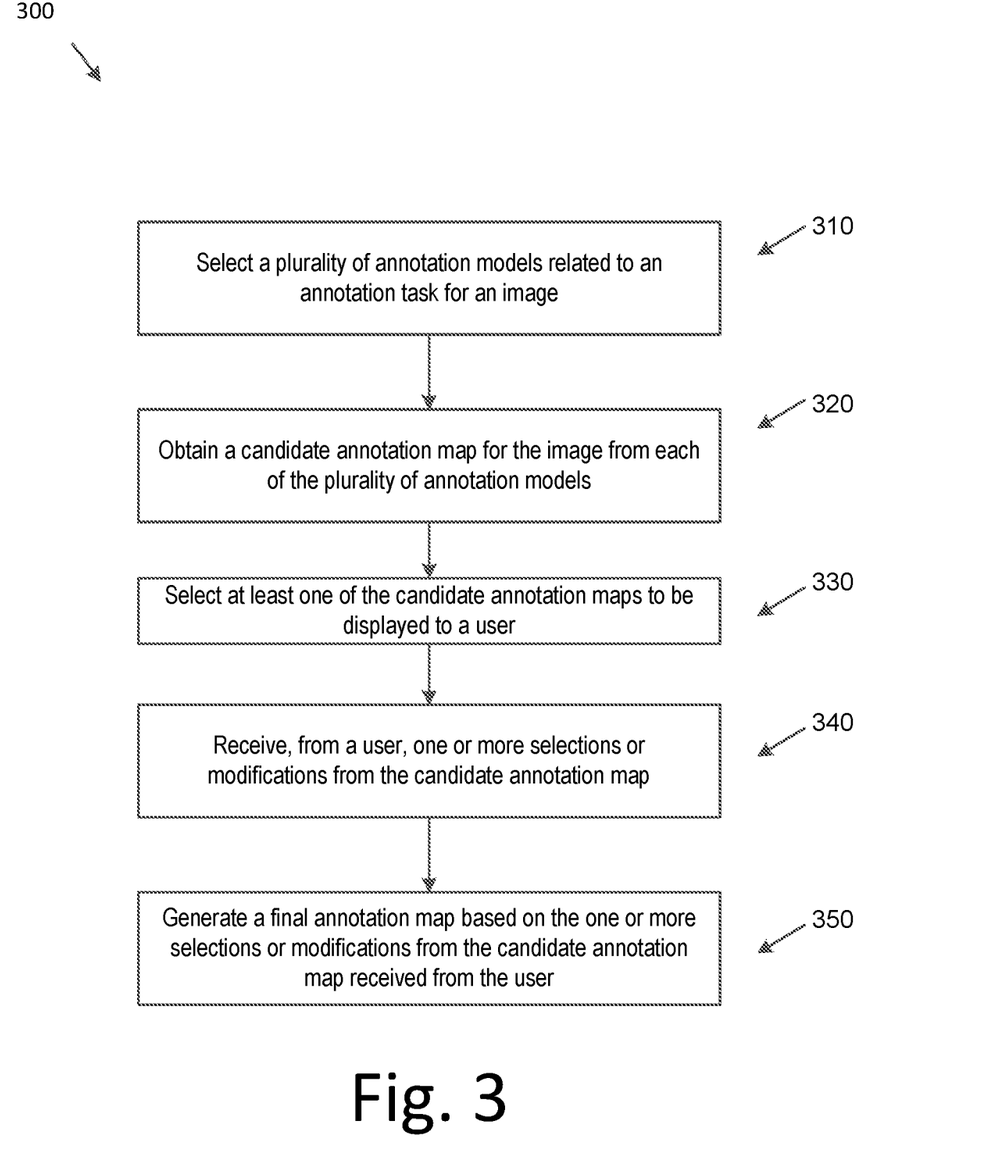
FIG. 3 is a flow diagram showing a method for image annotation using prior model sourcing, in accordance with some embodiments.

FIG. 3 is a flow diagram of an example method 300 of image annotation using prior model sourcing, in accordance with some embodiments. The processes described with reference to FIG. 3 may be performed, for example, by processing logic of machine learning architecture 127 and/or annotation application 155, as described with respect to FIG. 1.

At block 310, processing logic selects a plurality of annotation models related to an annotation task for an image. The annotation task may include identifying and marking locations within an image. Identifying and marking the locations within the image may include selecting one or more pixels of the image to include a tag classifying the pixels into one of several categories. In one example, the processing logic may perform a model search to identify models that are related to the task. For example, if the task is skin wrinkle detection then models related to identifying small curvy lines or structures within an image may be selected (e.g., models for identifying roads or waterways on a map, blood vessel detection in the retina, etc.). The models may include, for example, Gabor, retinal model, Sobel edge model, fringe filters, or any other machine learning model or heuristic model associated with the task (e.g., wrinkle detection, defect detection, etc.).

At block 320, processing logic obtains a candidate annotation map for the image from each of the plurality of annotation models. Each of the selected annotation models may be run on the image to generate a candidate annotation map from each of the models. Each model may include associated parameters and parameters thresholds that may be adjusted by the user. The candidate annotation maps produced by each of the models may each be individually sourced from to generate a final annotation map, as further discussed at block 350.

At block 330, processing logic selects at least one of the candidate annotation maps to be displayed to a user. The user may identify or select which models and accordingly, which candidate annotation map is presented to the user. The candidate annotation map may display potential annotations that can be selected from to be added to a final annotation map.

At block 340, processing logic receives, from a user, one or more selections or modifications of the candidate annotation map. For example, the user may select the potential annotations to be added the final annotation map by dragging a cursor window over the potential annotation, by dragging and dropping the potential annotations, or by any other selection method. The user may also make modifications to the selections from the candidate annotation map, such as adding or deleting annotations. In one example, the user may further select an additional annotation map and select further annotations to add to the final annotation map from the additional candidate annotation map. At block 350, processing logic generates a final annotation map based on the one or more selections from the candidate annotation map received from the user. The final annotation map may be a multi-level mask in which each pixel is associated with a value. For example, "0" may indicate no mask, "1" may indicate a first class, "2" may indicate a second class, and so forth. The final annotation map may include any number of classes and any value may be used to indicate the associated classes.

Figure 4:
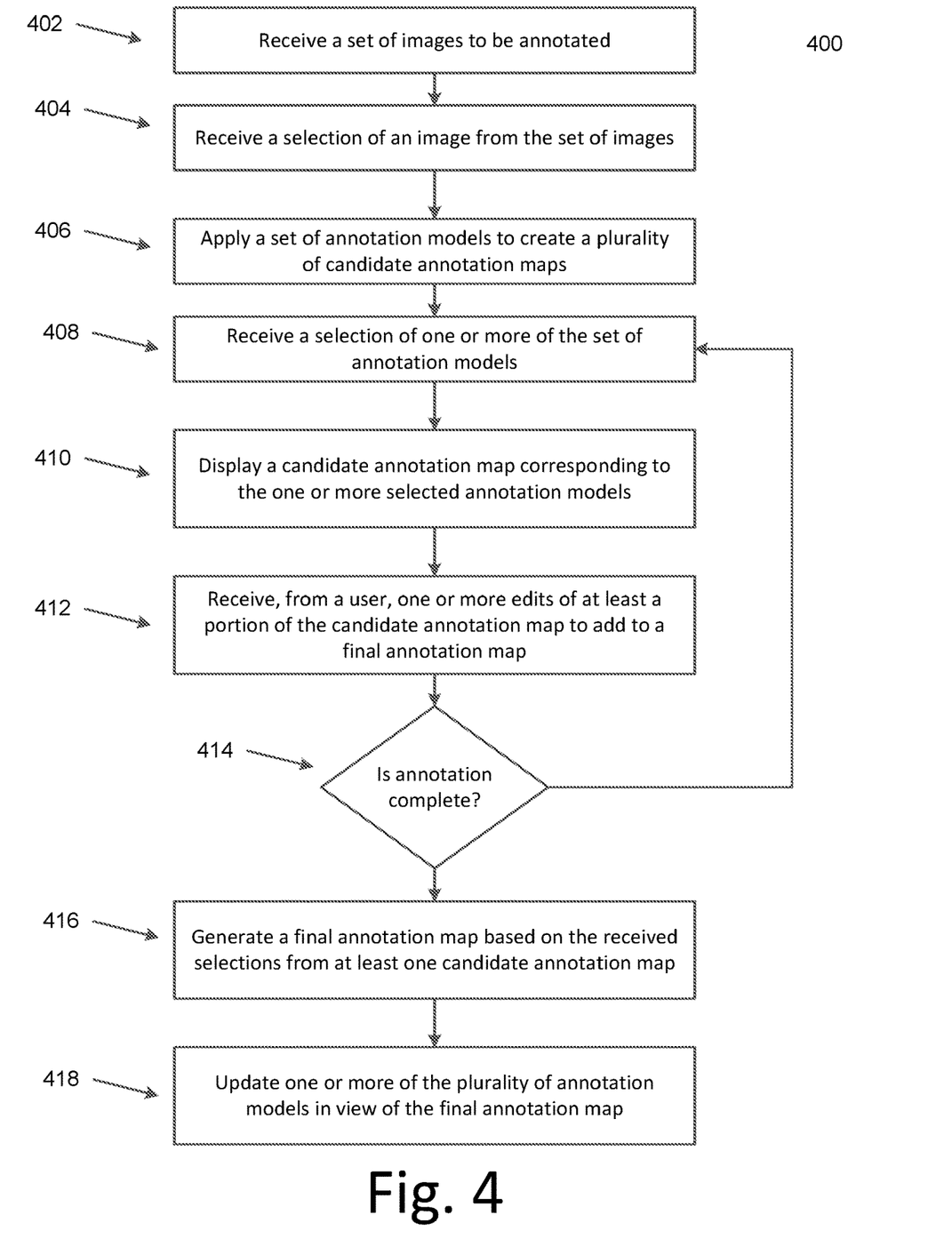
FIG. 4 is a flow diagram showing another method for image annotation using prior model sourcing, in accordance with some embodiments.

FIG. 4 is a flow diagram of another example method 400 of image annotation using prior model sourcing, in accordance with some embodiments. The processes described with reference to FIG. 4 may be performed, for example, by processing logic of machine learning architecture 127 and/or annotation application 155, as described with respect to FIG. 1.

At block 402, processing logic receives a set of images to be annotated. A user can select the set of images and provide them to the processing logic via drag and drop or any other file selection method. At block 404, processing logic receives a selection of an image from the set of images. The user may select from any of the images in the set of images to annotate.

At block 406, processing logic applies a set of annotation models to create a plurality of candidate annotation maps. The annotation models may be related to an annotation task required by the user. The annotation task may include identifying and marking locations within an image. Identifying and marking the locations within the image may include selecting one or more pixels of the image to include a tag classifying the pixels into one of several categories. Each of the annotation models may be applied to the image selected at block 404. The annotation models may include a spatial filter, morphological operators, a neural network, or any other filter or machine learning model for annotating an image.

At block 408, processing logic receives a selection of one or more of the set of annotation models. The user may select and switch between candidate maps for the annotation models. Thus, the user can source from multiple annotation models for a single image.

At block 410, processing logic displays to a user a candidate annotation map corresponding to the one or more selected annotation models. The candidate annotation map may include potential and/or suggested annotations to be applied to the image based on the model associated with the candidate annotation map. Additional parameters may be adjusted to modify the model and thus the suggested annotations of the candidate annotation map. For example, adjustable parameters may include a contrast based threshold, a gradient based threshold, fineness threshold, coarseness threshold and so forth. A user may adjust the parameter thresholds to include more or fewer suggested annotations in the candidate annotation map.

At block 412, processing logic receives, from a user, one or more modifications (i.e., edits) of at least a portion of the candidate annotation map to be included in a final annotation map. The modifications by the user may include several operations. For example, the modifications by the user may include a selection of suggested annotations of the candidate annotation map to be included in a final annotation map. The modifications by the user may additionally include deletion of annotations from the final annotation map, manual additions to the annotations, or a copy of annotations from the candidate annotation map. In one example, the modifications In an alternative embodiment, the processing logic may include all suggested annotations in the final annotation map and the user may then remove any of the suggested annotations that are unwanted in the final annotation map. Again, the user may add any further annotations manually.

At block 414, processing logic determines whether the annotation of the image is complete. In one example, the annotation may be complete when the user selects an option to save the annotation. In another example, the annotation may be indicated as complete at the end of a session of annotation. In another example, the user may continue to add annotations to the final annotation map until the user is satisfied with the annotations. If the user has not finished annotation, the method may return to block 408 where the user may select another annotation model to source from and repeat blocks 408-412. If annotation is complete, the method continues to block 416.

At block 416, processing logic generates a final annotation map based on the received selections from at least one candidate annotation map. Each of the selections from the candidate annotations maps along with any other edits and annotations may be included in the final annotation map. At block 418, processing logic updates one or more of the plurality of annotation models in view of the final annotation map. The processing logic may provide the user modifications and the final annotation map back to the model as additional training data. For example, after a certain number of final annotation maps are completed by a user the processing logic may provide to an online annotation model learning system to update and retrain one or more of the models. In another example, the processing logic updates the annotation models at a specified time each day, or other defined time period, using the final annotation maps generated during that time period. Accordingly, improvements to the suggested annotations of the candidate annotation maps may be made after each training iteration. Therefore, the manual effort required to annotate future images may further be reduced as increasingly refined and accurate annotation models and maps are created.

Figure 5:
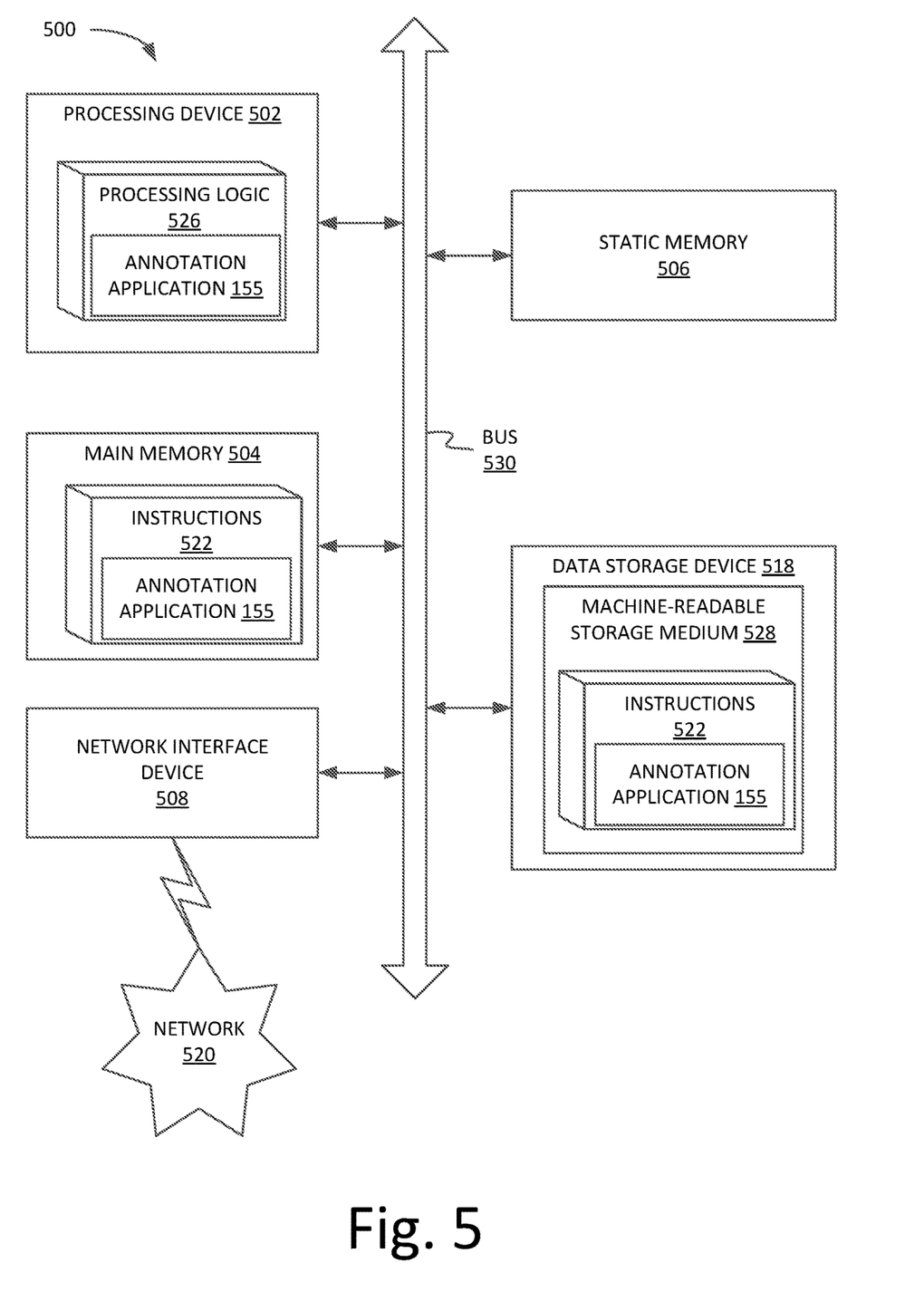
FIG. 5 is an illustration showing an example computing device which may implement the embodiments described herein.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server computer system, such as system 100.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of system 100 shown in FIG. 1, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute system 100. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform the methods and operations described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method of image annotation comprising:
   selecting a plurality of annotation models related to an annotation task for an image;
   obtaining a candidate annotation map for the image from each of the plurality of annotation models;
   selecting a first candidate annotation map from the candidate annotation maps, the first candidate annotation map to be displayed via a user interface of a client device, wherein each of the candidate annotation maps comprises suggested annotations for the image;
   receiving, by a processing device, a first set of user selections or modifications of at least one of the suggested annotations from the first candidate annotation map;
   selecting, from the candidate annotation maps, a second candidate annotation map to be displayed thereafter via the interface of the client device, the second candidate annotation map comprising additional suggested annotations for the image;
   receiving a second set of user selections or modifications of at least one of the additional suggested annotations; and
   generating, by the processing device, a final annotation map based on the first set of user selections or modifications from the first candidate annotation map and the second set of user selections or modifications from the second candidate annotation map.

2. The method of claim 1, further comprising:
   providing the final annotation map as additional training data to update at least one of the plurality of annotation models.

3. The method of claim 1, wherein the annotation task comprises identifying and marking locations within the image.

4. The method of claim 3, wherein the annotation task comprises identifying and marking skin wrinkles within the image.

5. The method of claim 1, wherein each of the plurality of annotation models comprises a spatial filter, morphological operators, or a neural network.

6. The method of claim 1, wherein the user interface comprises:
   a display of the image;
   at least one option to source from the first candidate annotation map; and
   at least one adjustable parameter associated with a model of the first candidate annotation map.

7. A system comprising:
   a memory; and
   a processing device, operatively coupled to the memory, to:
   select a plurality of annotation models related to an annotation task for an image;
   obtain a candidate annotation map for the image from each of the plurality of annotation models;
   select a first candidate annotation map from the candidate annotation maps, the first candidate annotation map to be displayed via a user interface of a client device, wherein each of the candidate annotation maps comprises suggested annotations for the image;
   receive a first set of user selections or modifications of at least one of the suggested annotations from the first candidate annotation map;
   select, from the candidate annotation maps, a second candidate annotation map to be displayed thereafter via the interface of the client device, the second candidate annotation map comprising additional suggested annotations for the image;
   receive a second set of user selections or modifications of at least one of the additional suggested annotations; and
   generate a final annotation map based on the first set of user selections or modifications from the first candidate annotation map and the second set of user selections or modifications from the second candidate annotation map.

8. The system of claim 7, wherein the processing device is further to:
provide the final annotation map as additional training data to update at least one of the plurality of annotation models.

9. The system of claim 7, wherein the annotation task comprises identifying and marking locations within the image.

10. The system of claim 9, wherein the annotation task comprises identifying and marking skin wrinkles within the image.

11. The system of claim 7, wherein each of the plurality of annotation models comprises a filter, morphological operators, or a neural network.

12. The system of claim 7, wherein the user interface comprises:
a display of the image;
at least one option to source from the first candidate annotation map; and
at least one adjustable parameter associated with a model of the first candidate annotation map.

13. A non-transitory computer-readable storage medium having instructions stored thereon that, when executed by a processing device, cause the processing device to:
select a plurality of annotation models related to an annotation task for an image;
obtain a candidate annotation map for the image from each of the plurality of annotation models;
select a first candidate annotation map from the candidate annotation maps, the first candidate annotation map to be displayed via a user interface of a client device, wherein each of the candidate annotation maps comprises suggested annotations for the image;
receive a first set of user selections or modifications of at least one of the suggested annotations from the first candidate annotation map;
select, from the candidate annotation maps, a second candidate annotation map to be displayed thereafter via the user interface of the client device, the second candidate annotation map comprising additional suggested annotations for the image;
receive a second set of user selections or modifications of at least one of the additional suggested annotations; and
generate a final annotation map based on the first set of user selections or modifications from the first candidate annotation map and the second set of user selections or modifications from the second candidate annotation map.

14. The non-transitory computer-readable storage medium of claim 13, wherein the processing device is further to:
provide the final annotation map as additional training data to update at least one of the plurality of annotation models.

15. The non-transitory computer-readable storage medium of claim 13, wherein the annotation task comprises identifying and marking lines within the image.

16. The non-transitory computer-readable storage medium of claim 15, wherein the annotation task comprises identifying and marking skin wrinkles within the image.

17. The non-transitory computer-readable storage medium of claim 13, wherein each of the plurality of annotation models comprises a filter, morphological operators, or a neural network.

* * * * *